United States Patent [19]

Sasaki et al.

[11] Patent Number: 4,940,682

[45] Date of Patent: * Jul. 10, 1990

[54] SOLID CATALYST COMPONENT FOR OLEFIN POLYMERIZATION

[75] Inventors: Toshio Sasaki; Takeshi Ebara, both of Ichihara; Kiyoshi Kawai, Chiba, all of Japan

[73] Assignee: Sumitomo Chemical Company, Limited, Osaka, Japan

[*] Notice: The portion of the term of this patent subsequent to Feb. 21, 2006 has been disclaimed.

[21] Appl. No.: 262,786

[22] Filed: Oct. 26, 1988

[30] Foreign Application Priority Data

Oct. 28, 1987 [JP] Japan ................................ 62-274258

[51] Int. Cl.$^5$ .............................................. C08F 4/64
[52] U.S. Cl. ..................................... 502/113; 502/103; 502/109; 502/115; 502/116; 502/118; 502/120; 502/125; 502/126; 502/132; 502/133; 502/134
[58] Field of Search ............... 502/109, 113, 115, 116, 502/118, 120, 125, 126, 132, 133, 134, 103

[56] References Cited

U.S. PATENT DOCUMENTS 4,806,433 2/1989 Sasaki et al. .................... 502/115

FOREIGN PATENT DOCUMENTS

| 55-80418 | 6/1980 | Japan . |
| 57-61012 | 4/1982 | Japan . |
| 59-71306 | 4/1984 | Japan . |
| 59-105008 | 6/1984 | Japan . |
| 59-230011 | 12/1984 | Japan . |

*Primary Examiner*—Patrick P. Garvin
*Attorney, Agent, or Firm*—Stevens, Davis, Miller & Mosher

[57] ABSTRACT

A solid catalyst component for olefin polymerization which comprises a catalyst component comprising at least titanium and chlorine fixed onto a porous substance of which the pore volume, at a pore radius in a range of from 200 to 2,000 Å, is 0.3 cc/g or more, said pore volume is 35% or more of the pore volume at a pore radius in a range of from 35 to 75,000 Å, the average particle diameter is from 5 to 300 μm, the geometrical standard deviation of the particle size distribution is 2 or less and the solubility in toluene at 100° C. is 30 wt. % or less.

13 Claims, 1 Drawing Sheet

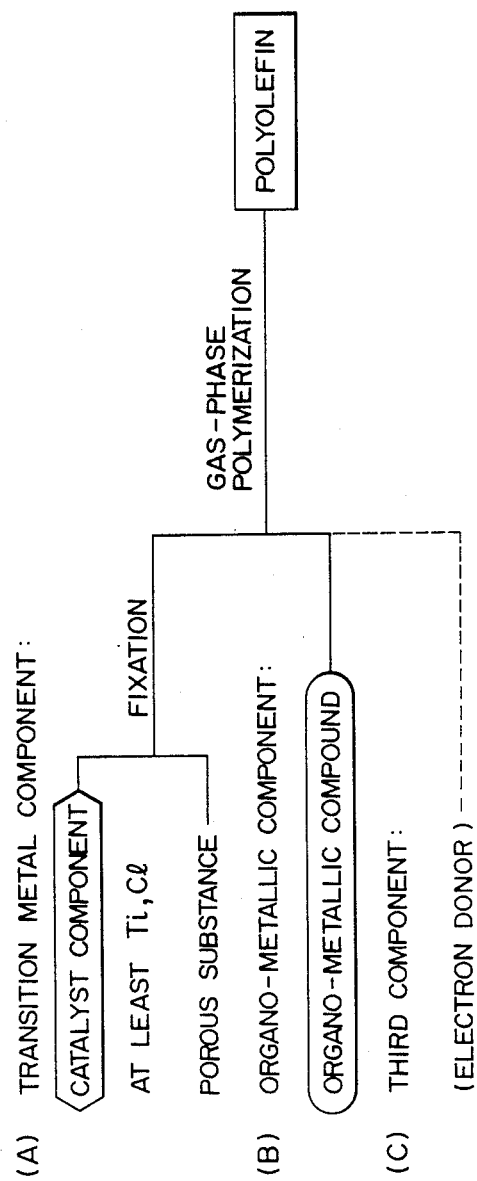
FIG. I

SOLID CATALYST COMPONENT FOR OLEFIN POLYMERIZATION

BACKGROUND OF THE INVENTION

1. Field of the Invention

The present invention relates to a solid catalyst component for olefin polymerization. More particularly, the present invention relates to a novel catalyst component used to produce granular olefinic thermoplastic elastomers and olefinic elastomers. Among various thermoplastic elastomers and elastomers, olefinic thermoplastic elastomers and olefinic elastomers, because of their excellent thermal resistance, ozone resistance and color stability, are mainly used in the fields of automobiles, household electric appliances and architecture.

2. Description of the Prior Art

Hitherto, the olefinic thermoplastic elastomers are produced by separately producing polypropylene or other olefinic resins and olefinic copolymeric rubbers (e.g. ethylene/propylene rubbers) in advance and then blending two these components. However, the olefinic copolymeric rubbers are generally produced by solution polymerization, so that this method is disadvantageous in terms of the cost. Also, strong kneading is necessary to blend with the olefinic resins, so that large quantities of energy is necessary, and therefore this method is disadvantageous in terms of the manufacturing cost. This is a well-known fact.

A method of directly producing the foregoing thermoplastic elastomers under particular conditions according to slurry-phase two-stage polymerization is proposed by JP-A-No. 55-80418, JP-A-No. 57-61012, etc. Also, in these methods, the ethylene/propylene random copolymer is dissolved in large amounts in a solvent, so that the viscosity of the system increases to make the removal of the polymerization heat difficult and markedly promote adhesion of the polymer particles. As a result, there is a problem of stable production being difficult. In order to solve this problem, it is proposed to carry out the random copolymerization of ethylene with propylene at a very low temperature below 30° C. This method, however, has problems that the catalytic activity lowers, and that a large-sized refrigerator is necessary to remove the polymerization heat, which is disadvantageous economically.

Further, a method of producing the thermoplastic elastomers by gas-phase two-stage polymerization is proposed by JP-A-No. 59-105008. In this method, a reduction in the adhesive power of the polymer particles is tried by using inorganic oxides (e.g. silica gel) as a carrier for solid catalyst components, but the improvement effect of this method is still unsatisfactory.

The olefinic elastomers are generally produced by solution polymerization. This solution polymerization requires many steps including a step for recovering unreacted monomers, a step for removing ashes, a step for stripping, etc. And also, the formed polymer is in solution in the system, so that the viscosity of the system is high and stirring and heat removal are difficult, which is very disadvantageous in terms of the manufacturing cost.

In order to solve this problem, a method of producing the ethylene/propylene random copolymer by slurry polymerization in a liquid propylene is proposed by JP-A-No. 59-71306. In this method, an improvement in the productivity is observed, but the polymerization needs to be carried out at a very low temperature below 40° C., so that the catalytic activity lowers and also a large-sized refrigerator is necessary to remove the polymerization heat, which is disadvantageous from the industrial point of view.

Further, a method of directly producing the thermoplastic elastomers by gas-phase polymerization is proposed by JP-A-No. 59-230011. Also, in this method, in order to prevent the adhesion of the polymer particles thereby to carry out the gas-phase polymerization stably, the polymerization needs to be carried out at a low temperature and in a state wherein the monomer is diluted with a very large volume of inert gases such as nitrogen, etc. This method has problems of reducing the productivity and causing disadvantages in terms of industrial production.

In view of the situation like this, a problem to be solved by the present invention, i.e. an object of the present invention is to provide a novel solid catalyst component which makes it possible to improve the conventional technique of separately producing polypropylene and olefinic copolymeric rubbers (e.g. ethylene/propylene rubbers) in advance and then blending two these components, a method of producing the thermoplastic elastomers by slurry-phase two-stage polymerization at a low temperature, a technique of producing the thermoplastic elastomers by gas-phase two-stage polymerization using catalysts with inorganic oxides as a carrier, a technique of producing the olefinic elastomers by solution polymerization, a technique of producing the olefinic elastomers by slurry polymerization at a low temperature, and a technique of producing the olefinic elastomers by gas-phase polymerization at a low temperature and at a low monomer concentration, and also produce the granular olefinic thermoplastic elastomers and olefinic elastomers which are more superior in the performances by gas-phase polymerization.

In polymers containing a large amount of low crystalline polymers (e.g. ethylene/propylene rubbers), the adhesive power of the polymer particles is generally so markedly large that it is difficult to carry out the gas-phase polymerization stably.

That is, as a reactor for the gas-phase polymerization of $\alpha$-olefins, stirring/mixing vessel-type reactors, fluidized bed-type reactors, fluidized bed-type reactors equipped with a stirrer, etc. are proposed. When, however, the adhesive power of the polymer particles increases, reactors wherein stirring is to be carried out requires extremely a large power in order to keep a definite number of stirrings, so that the design of the equipments is accompanied by great difficulty. Also, in such cases, uniform mixing becomes difficult to attain, so that the distribution of high-temperature regions in the system is localized. As a result, a part of the polymers turns lump, and these lumps break the stirrer and thermometer in the reactor and make it difficult to draw the polymer particles from the reactor through a pipe.

On the other hand, in reactors wherein the polymerization is carried out in a fluidized state, the slagging phenomenon owing to the unreacted monomers becomes easy to occur, and as a result, the amount of the polymer particles scattered to the gas-circulation lines remarkably increases to cause adhesion of the particles to the lines and clogging of the lines with the particles.

Also, in such cases, uniform mixing is so difficult that there occurs a problem that a part of the polymers turns lump.

Further, when the adhesive power of the polymer particles is large, clogging of pipes through which the polymer particles are sent becomes easy to occur. Also, since bridging occurs at the lower part of the cyclones or inside the hoppers, there occurs a problem that it becomes difficult to draw the polymer particles stably from the cyclones or hoppers.

Consequently, although the gas-phase polymerization has an advantage of using no liquid medium which dissolves the low crystalline polymers, it is considered to be very difficult, in reality, to produce polymers containing the low crystalline polymers in large amounts.

Further, in the improved gas-phase polymerization, removal of the catalyst residues is not substantially carried out, so that the catalyst system used needs to be one highly improved in the polymerization activity.

The present inventors have extensively studied to solve the foregoing problems, and as a result, have found a solid catalyst component which enables granular olefinic thermoplastic elastomers and olefinic elastomers having excellent performances to be obtained efficiently by gas-phase polymerization. The present inventors thus attained to the present invention.

SUMMARY OF THE INVENTION

The present invention relates to a solid catalyst component for olefin polymerization which comprises a catalyst component comprising at least titanium and chlorine fixed onto a porous substance of which the pore volume at a pore radius in a range of from 200 to 2,000 Å is 0.3 cc/g or more, said pore volume is 35% or more of the pore volume at a pore radius in a range of from 35 to 75,000 Å, the average particle diameter from 5 to 300 μm, the geometrical standard deviation of the particle size distribution is 2 or less and the solubility in toluene at 100° C. is 30 wt. % or less.

BRIEF DESCRIPTION OF THE DRAWINGS

FIG. 1 is a flow sheet for helping the understanding of the present invention. This flow sheet is one example of the embodiments of the present invention, and the present invention is not limited thereto.

DETAILED DESCRIPTION OF THE INVENTION

The present invention will be illustrated below in detail.

(a) Solid catalyst component

The solid catalyst component of the present invention is one in which a catalyst component comprising at least titanium and chlorine has been fixed onto a porous substance of which the pore volume at a pore radius in a range of from 200 to 2,000 Å is 0.3 cc/g or more, said pore volume is 35% or more of the pore volume at a pore radius in a range of from 35 to 75,000 Å, the average particle diameter is from 5 to 300 μm, the geometrical standard deviation of the particle size distribution is 2 or less and the solubility in toluene at 100° C. is 30 wt. % or less.

The following performances may be mentioned as ones required for the catalyst of the present invention: The catalyst should exhibit sufficiently a high activity in random copolymerization between ethylene and α-olefin or between different α-olefins and produce the copolymer having good physical properties; and it should produce polymer particles having good particle properties. Also, when multi-stage polymerization is carried out to produce a polymer consisting mainly of polypropylene in the course of the polymerization, it is required for the catalyst to produce the polymer having a higher stereoregularity.

According to the examination of the present inventors, when a solid catalyst component is used which has such a high catalytic activity that the amount of the whole polymer produced per 1 g of titanium atoms in the solid catalyst component is $5 \times 10^4$ g or more, preferably $7.5 \times 10^4$ g or more, particularly preferably $10 \times 10^4$ g or more, it becomes possible to produce the thermoplastic elastomers without substantially removing the catalyst residues, so that the use of such the solid catalyst component is advantageous.

Also, when homopolymerization of propylene is carried out, it is preferred in terms of the physical properties of the polymer to use a catalyst system capable of producing polypropylene having such a stereoregularity that the 20° C. xylene-soluble portion (the amount of atactic polypropylene produced) contained in the polypropylene is 10 wt. % or less, preferably 7 wt. % or less, particularly preferably 5 wt. % or less.

Also, in order to produce the copolymer having good particle properties, the average particle diameter of the solid catalyst component is an important factor. That is, the average particle diameter of the solid catalyst component is from 5 to 300 μm, preferably from 10 to 250 μm. When the average particle diameter is smaller than 5 μm, the adhesive power of the polymer particles increases, and in the case of fluidized bed-type gas-phase reactors, there occurs a problem that the catalyst and polymer particles scatter away. On the other hand, when the average particle diameter is larger than 300 μm, a minimum fluidization rate in the fluidized bed-type gas-phase reactors remarkably increases, so that it becomes difficult to keep a stable fluidized state and there occurs a problem of the polymer particles turning lump.

This solid catalyst component will be illustrated more specifically.

The porous substance usable in the present invention may be any of the known ones. For example, there are mentioned porous inorganic oxides represented by $SiO_2$, $Al_2O_3$, $MgO$, $TiO_2$, $ZrO_2$, $SiO_2.Al_2O_3$, $MgO.Al_2O_3$, $MgO.SiO_2.Al_2O_3$, etc., and polystyrene-, polyacrylic acid ester-, polymethacrylic acid ester-, polyacrylonitrile-, polyvinyl chloride- and polyolefin-series porous organic polymers represented by polystyrene, styrene/divinylbenzene copolymers, styrene/N,N'-alkylenedimethacrylamide copolymers, styrene/ethylene glycol methyl dimethacrylate copolymers, methyl polyacrylate, ethyl polyacrylate, methyl acrylate/divinylbenzene copolymers, ethyl acrylate/divinylbenzene copolymers, methyl polymethacrylate, methyl methacrylate/divinylbenzene copolymers, polyethylene glycol methyl dimethacrylate, polyacrylonitrile, acrylonitrile/divinylbenzene copolymers, polyvinyl chloride, polyvinyl pyrrolidine, polyvinyl pyridine, ethylvinylbenzene/divinylbenzene copolymers, polyethylene, ethylene/methyl acrylate copolymers, polypropylene, etc. Among these porous substances, porous organic polymers are preferably used, and among these porous organic polymers, polystyrene-, polyvinyl chloride-, polyolefin- and polyacrylonitrile-series porous polymer beads are preferably used. Further, styrene/divinylbenzene copolymers and acrylonitrile/divinylbenzene copolymers are more preferably used, and styrene/divinylbenzene copolymers are particularly preferably used.

The pore volume, at a pore radius of 200 to 2,000 Å, of the porous substance is 0.3 cc/g or more, preferably 0.4 cc/g or more, and besides, said pore volume is 35% or more, preferably 40% or more of the pore volume at a pore radius in a range of from 35 to 75,000 Å. When the pore volume of the porous substance is small, the catalyst component cannot effectively be fixed. Even if the pore volume of the porous substance is larger than 0.3 cc/g, the catalyst component cannot effectively be fixed unless the pore radius exists at a pore radius in a range of from 200 to 2,000 Å, and also, it does not become an effective catalyst for the olefinic elastomers.

The average particle diameter of the porous substance is from 5 to 300 μm, preferably from 10 to 250 μm, and the geometrical standard deviation, $\sigma g$, of the particle size distribution of the substance is 2.0 or less, preferably 1.8 or less. When the average particle diameter is smaller than this range, the adhesive power of the polymer particles increases and in the case of fluidized bed-type reactors, there occurs a problem that the catalyst and polymer particles scatter away. On the other hand, when the average particle diameter is larger than this range, a minimum fluidization rate in fluidized bed-type reactors remarkably increases, so that it becomes difficult to keep a stable fluidized state and there occurs a problem of the polymer particles turning lump.

The geometrical standard deviation, $\sigma g$, of particle size distribution is expressed by the ratio of $\overline{Dg}$ to $\overline{Dp}$ described in the following equation on the assumption that the particle size distribution applies to the logarithmic probability distribution equation:

$$\sigma g = \frac{\overline{Dg}}{\overline{Dp}}$$

wherein $\overline{Dg}$ represents a particle diameter at a time when the cumulative weight % is 50%, and $\overline{Dp}$ represents a particle diameter at a time when the cumulative weight % is 15.8%.

When $\sigma g$ is larger than the above range, there occurs a problem that very fine polymer particles or polymer particles having a large particle diameter are produced.

Further, in the present invention, by using a solid catalyst component having particularly limited average particle diameter and particle size distribution, it becomes possible to provide polymer particles containing fine particles in smaller amounts and particularly having no problems in terms of molding.

The solubility in toluene at 100° C. of the porous substance used in the present invention is 30 wt. % or less, preferably 20 wt. % or less. When the porous substance is dissolved in organic solvents such as toluene, there sometimes occurs a disadvantage that the number of micropores decreases when the catalyst component is fixed onto the porous substance.

Next, explanation will be given specifically to the catalyst component comprising at least titanium and chlorine which is to be fixed onto the porous substance.

The catalyst component used in the present invention may be any of those generally called the titanium trichloride-type catalyst and those generally called the titanium/magnesium composite-type catalyst. When the titanium/magnesium composite-type catalyst is used, the atomic ratio of titanium to magnesium is from 0.01 to 0.8, preferably from 0.02 to 0.2, and the atomic ratio of chlorine to magnesium is from 1.8 to 10, preferably from 2.0 to 5.0.

As a method for producing such a catalyst component, there may be mentioned methods, for example, disclosed in JP-B-No. 58-21922, JP-A-No. 59-126402, JP-B-No. 35-495, JP-A-No. 46-4393, JP-B-No. 46-31330, JP-A-No. 47-42283, JP-A-No. 49-86483, JP-B-No. 57-24361, JP-B-No. 39-12105, JP-B-No. 43-13050, JP-B-No. 46-34092, JP-B-No. 46-34098, JP-B-No. 47-41676, JP-B-No. 55-23561, etc.

For fixing the catalyst component onto the porous substance, mechanical methods such as pulverization, etc. and chemical ones at a slurry state are used. However, the latter methods are preferred in terms of the particle properties.

As specific examples of such methods, there may be applied methods which are disclosed for example in JP-A-No. 52-42585, JP-A-No. 54-148093, JP-A-No. 56-47407, JP-A-No. 59-230006, JP-A-No. 61-37803, etc., and which comprise impregnating the porous substance (e.g. silica gel) with the catalyst component.

As examples of these methods, the following ones may be mentioned:

(1) A method comprising treating the porous substance with an organo-magnesium compound such as Grignard reagents, etc. and then with TiCl$_4$, etc.

(2) A method comprising treating the porous substance with an organo-magnesium compound such as Grignard reagents, etc., reacting with a halogenating agent and/or an alcohol, and then treating with a titanium compound such as TiCl$_4$, etc.

(3) A method comprising dissolving a magnesium halide compound and/or alkoxymagnesium compound in various donors such as alcohols, ethers, etc., producing a complex with TiCl$_4$, etc., and then impregnating the resulting complex into the porous substance.

(4) A method comprising dissolving a magnesium halide compound and/or alkoxymagnesium compound in various donors such as alcohols, ethers, etc., impregnating into the porous substance, and then treating with a titanium compound such as TiCl$_4$, etc.

(5) A method comprising reducing an alkoxytitanium compound with an organo-magnesium compound such as Grignard reagents, etc. in the coexistence of the porous substance, and then treating with a mixture of an ether compound and titanium tetrachloride.

(6) A method comprising reducing an alkoxytitanium compound with an organo-aluminum compound in the coexistence of the porous substance, and then treating the resulting solid product with a mixture of an ether compound and titanium tetrachloride.

Among these methods, the method described in (5) can preferably be used. More preferably, there may be used a method of reducing an alkoxytitanium compound with an organo-magnesium compound such as Grignard reagents, etc. in the coexistence of an organo-silicon compound having an Si-O bond and an organic porous polymer, and then treating the resulting solid product with a mixture of an ether compound and titanium tetrachloride (JP-A-No. 61-296007 and JP-A-No. 63-83106).

The amount of the catalyst component to be fixed onto the porous substance is from 1 to 70 wt. %, preferably from 3 to 60 wt. %, particularly preferably from 5 to 55 wt. % as a content in the solid catalyst component. When the amount of the catalyst component is too large, the particle properties of the polymer become poor. Contrary to this, when the amount is too small, the activity per solid catalyst lowers.

The titanium compound used to synthesize the catalyst component used in the present invention is expressed by the formula, $Ti(OR^1)_a X_b$, in which $R^1$ represents a $C_1$-$C_{20}$ hydrocarbon residue, X represents a halogen atom, and a and b represent figures satisfying $0 \leq a \leq 4$ and $0 \leq b \leq 4$, respectively and besides $a+b=3$ or 4.

Specifically, the following compounds can preferably be used: Titanium trichloride, ethoxytitanium dichloride, butoxytitanium dichloride, titanium tetrachloride, ethoxytitanium trichloride, butoxytitanium trichloride, phenoxytitanium trichloride, dibutoxytitanium dichloride, diphenoxytitanium dichloride, tributoxytitanium chloride, tetraethoxytitanium, tetrabutoxytitanium, tetraphenoxytitanium, etc.

When magnesium compounds are used, the following ones are used.

As examples of magnesium compounds containing a magnesium-carbon bond or magnesium-hydrogen bond and having a reducing power, for example the following ones are preferably used: Diethylmagnesium, dibutylmagnesium, dihexylmagnesium, ethylmagnesium chloride, butylmagnesium chloride, hexylmagnesium chloride, butylethoxymagnesium, butylmagnesium hydride, etc. These magnesium compounds may be used in the form of complexes with organo-aluminum compounds. On the other hand, as examples of magnesium compounds having no reducing power, the following ones are preferably used: Magnesium dihalides (e.g. magnesium dichloride, magnesium dibromide), alkoxymagnesium compounds (e.g. methoxymagnesium chloride, ethoxymagnesium chloride, butoxymagnesium chloride, phenoxymagnesium chloride, diethoxymagnesium, dibutoxymagnesium, diphenoxymagnesium), the carboxylates of magnesium (e.g. magnesium laurate, magnesium stearate), etc. These magnesium compounds having no reducing power may be synthesized, previously or at the time of preparation of the solid catalyst, from the magnesium compounds having a reducing power according to the known method.

When organo-aluminum compounds are used as a reducing agent, there may be used organo-aluminum compounds represented by the formula, $AlR_c^2 Y_{3-c}$, in which $R^2$ represents a $C_1$-$C_{20}$ hydrocarbon residue, Y represents a halogen atom, and c represents a figure satisfying $1 \leq c \leq 3$. Specific examples include ethylaluminum sesquichloride, dimethylaluminum chloride, diethylaluminum chloride, di-n-propylaluminum chloride, trimethylaluminum, triethylaluminum, triisobutylaluminum, ethyldicyclohexylaluminum, triphenylaluminum, diethylaluminum hydride, diisobutylaluminum hydride, diethylaluminum bromide, diethylaluminum iodide, etc.

A known ester compound may be added to the solid catalyst component. Such the ester compound is the esters of mono- and polycarboxylic acids including aliphatic carboxylic acid esters, olefinicarboxylic acid esters, alicyclic carboxylic acid esters and aromatic carboxylic acid esters. Specifically, there are mentioned methyl acetate, ethyl acetate, phenyl acetate, methyl propionate, ethyl propionate, ethyl butyrate, ethyl valerate, methyl acrylate, ethyl acrylate, methyl methacrylate, ethyl benzoate, butyl benzoate, methyl toluylate, ethyl toluylate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, di-n-propyl phthalate, diisopropyl phthalate, di-n-butyl phthalate, diisobutyl phthalate, di-n-heptyl phthalate, di-n-octyl phthalate, diphenyl phthalate, etc.

(b) Promoter

The solid catalyst component of the present invention can be used for olefin polymerization in combination with the organo-metallic compound of a metal belonging to Group I to Group III of the periodic table. As examples of the organo-metallic compound, there are mentioned alkylaluminum compounds, alkylaluminum alkoxides, alkylaluminum hydrides, alkylaluminum halides, alkylaluminoxanes, dialkylzincs, dialkylmagnesiums, etc. Of these compounds, those which are preferably used include trialkylaluminums (e.g. triethylaluminum, triisobutylaluminum, trihexylaluminum), dialkylaluminum hydrides (e.g. diethylaluminum hydride, diisobutylaluminum hydride), a mixture of trialkylaluminum and dialkylaluminum hydride, and alkylaluminoxanes (e.g. tetraethyl dialuminoxane, tetrabutyl dialuminoxane).

The amount of the organo-metallic compound to be used can be selected from a wide range of from 1 to 1,000 moles per 1 mole of titanium atoms in the solid catalyst component. However, a range of from 5 to 600 moles is particularly preferred.

In carrying out the polymerization, the known electron donors may be made to coexist for the purposes of regulating the molecular weight of the polymer and in some cases, improving the stereoregularity of the polymer. Such the electron donors include esters and acid anhydrides such as ethyl acetate, e-caprolactone, methyl methacrylate, methyl benzoate, ethyl benzoate, ethyl p-anisate, methyl p-toluylate, diethyl phthalate, dibutyl phthalate, diisobutyl phthalate, phthalic anhydride, etc., ether compounds such as dibutyl ether, diphenyl ether, etc.; organo-phosphorus compounds such as tributyl phosphite, triphenyl phosphite, hexamethylene phosphoric triamide, etc.; organo-silicon compounds having an Si—O—C bond such as tetramethoxysilane, methyltrimethoxysilane, phenyltrimethoxysilane, diphenyldimethoxysilane, etc.; amines such as 2,6-substituted piperidines, 2,5-substituted pyrrolidines, etc. In addition to these compounds, ketones, amides, thioethers may also be used.

When the electron donors are used, their amount used is from 0.01 to 5 moles, preferably from 0.03 to 3 moles, particularly preferably from 0.05 to 1.0 mole per 1 mole of the metal atom of the organo-metallic compound.

(c) Polymerization method

On using the solid catalyst component of the present invention, ethylene copolymers can be obtained by carrying out the random copolymerization of ethylene with an α-olefin in a mixed gas comprising ethylene and an α-olefin. Also, α-olefin copolymers can be obtained by carrying out the random copolymerization of different α-olefins in a mixed gas comprising the different α-olefins.

A more specific embodiment of the polymerization will be illustrated with reference to the synthesis of ethylene copolymers. The polymerization is a random copolymerization of ethylene with an α-olefin in a gaseous phase.

As examples of α-olefin to be copolymerized with ethylene, there are mentioned propylene, butene-1, pentene-1, hexene-1, 4-methylpentene-1, 3-methylbutene-1, etc. Particularly, propylene and butene-1 are preferred.

In the copolymerization of the present invention, ethylene, α-olefin and additionally polyene may be copolymerized in order to facilitate the vulcanization of the copolymer. Specific examples of the polyene includes butadiene, dicyclopentadiene, 1,3,7-octatriene, vinylcyclohexane, 5-ethylidene-2-norbornene, 5-isopropenyl-2-norbornene, 1,4-hexadiene, 1,5-hexadiene, 1,9-decadiene, etc. Of these polyenes, non-conjugated dienes are preferred, and particularly straight-chain non-conjugated dienes are preferred.

The ethylene content of the ethylene/α-olefin copolymers is from 5 to 95 wt. %, preferably from 15 to 90 wt. %. When the ethylene content of the produced copolymers exceeds the above range, properties as rubber are damaged, so that such the content is not preferred. While when the ethylene content is below the above range, the low-temperature characteristics and properties as rubber are also damaged, so that such the content is not preferred.

When the polyene is made to coexist in the copolymerization system, the amount of the polyene is regulated so that the iodine value of the copolymer is from 2 to 50, preferably from 3 to 40.

Further, in the present invention, the polymerization may be carried out in two or more stages by changing the ethylene concentration. In this case, ethylene or α-olefin may be homopolymerized in the first stage if the amount of the resulting homopolymer is for example about 40 wt. % or less of the amount of the whole polymer.

A preferred polymerization condition is one under which liquefaction of the monomer in the polymerization reactor does not occur in a temperature range below the melting temperature of the polymer, preferably in a temperature range of from 20° to 85° C., particularly preferably from 40° to 75° C. and in a pressure range of from normal pressure to 40 kg/cm². Further, in carrying out the copolymerization, it is preferred to add hydrogen as a molecular weight regulating agent for the purpose of regulating the melt-flowability of the final product. Also, in the copolymerization, an inert gas may be made to coexist in the mixed gas. When the amount of the inert gas is too large (for example, amounts exceeding 25 mole %), the productivity remarkably lowers, so that the coexistence of an excess of the inert gas is not preferred.

The molecular weight of the ethylene/α-olefin random copolymer produced by the copolymerization is from 0.3 to 10, preferably from 0.5 to 8, particularly preferably from 1 to 5, as expressed by intrinsic viscosity, [η], in tetralin at 135° C. When [η] is too small, a sufficient tensile strength is not obtained. While when [η] is too large, the moldability becomes remarkably poor.

By carrying out the polymerization using the solid catalyst component of the present invention, polymers having an adhesive power of, usually, 6.0 g/cm² or less and good particle properties can be obtained.

Gas-phase polymerization reactors used to carry out the present invention are not particularly limited, and it is possible to use the known stirring/mixing vessel-type reactors, fluidized bed-type reactors, fluidized bed-type reactors equipped with a stirrer, etc.

The polymerization of the present invention can be carried out by any of a method of carrying out the polymerization continuously with two or more reactors connected in series, a method of carrying out the polymerization in a batch form with one or more reactors and combination of the both.

The method of the present invention will be illustrated in more detail with reference to the following examples, but it is not limited to these examples only.

The values of physical properties in the examples were measured by the following methods.

(1) Intrinsic viscosity (hereinafter abbreviated to [η]): Measured at 135° C. in a tetralin solvent.

(2) Content of ethylene and 1,9-decadiene: Quantitatively determined by the use of the absorption bands of infrared absorption spectrum, said bands being 722, 733 and 736 cm$^{-1}$ for ethylene and 1,640 cm$^{-1}$ for 1,9-decadiene.

The ethylene content obtained agreed approximately with the value obtained from material balance.

(3) Pore volume: Measured for the pore volume at a pore radius in a range of from 35 to 75,000 Å by the mercury porosimetry using Poresizer 9310 (porosimeter) produced by Micromeritics Co., Ltd.

(4) Average particle diameter of solid catalyst: Obtained by optical microscopic observation.

(5) Adhesive power of polymer particles: Two pieces of aluminum cell for shear test, 30 mm in width, 53 mm in length and 12 mm in height, were closely adhered to each other one upon another; the polymer particles to be measured were put in the inside and pre-pressurized for 30 seconds under a load of 1,000 g; a single shear test was carried out at room temperature at a take-off rate of 100 mm/min while applying different vertical loads of 50 g, 100 g, 200 g, 300 g and 400 g; and thus shearing stress to each vertical load was measured. The plots of the vertical loads and the measurements values of the shearing stress corresponding thereto were approximated to a straight line by the least-squares method, and the shearing stress obtained by extrapolation to a vertical load of 0 g was taken as the adhesive power.

(6) 20° C. xylene-soluble portion (hereinafter abbreviated to CXS): One gram of the polymer was dissolved in 200 ml of a boiling xylene; the solution was slowly cooled to 50° C. and then to 20° C. with stirring in ice water and allowed to stand at 20° C. for 3 hours; the precipitated polymer was filtered off, and xylene was vaporized from the filtrate; and the residue was vacuum-dried at 60° C. to recover the 20° C. xylene-soluble polymer.

EXAMPLE 1

(A) Synthesis of organo-magnesium compound

The air in a 1-liter flask equipped with a stirrer, reflux condenser, dropping funnel and thermometer was replaced by argon, and 32.0 g of magnesium chips for Grignard reagents was added.

120 grams of n-butyl chloride and 500 ml of di-n-butyl ether were put in the dropping funnel, and about 30 ml of the resulting mixture was added dropwise to the magnesium in the flask to start reaction. After beginning of the reaction, the mixture was added dropwise at 50° C. over 4 hours. After completion of the addition, the reaction was continued at 60° C. for further 1 hour. Thereafter, the reaction solution was cooled to room temperature, and the solid product was filtered off.

n-Butylmagnesium chloride in di-n-butyl ether was hydrolyzed with 1 N sulfuric acid and back-titrated with 1 N aqueous sodium hydroxide solution to determine the concentration (indicator, phenolphthalein). As a result, the concentration was 2.0 mole/liter.

(B) Synthesis of solid product

The air in a 200-ml flask equipped with a stirrer and dropping funnel was replaced by argon, and then Chromosorb 101 (produced by Jhons-Manville Co., Ltd.), 5.0 g of porous polymer beads, previously vacuum-dried at 80° C. for 0.5 hour, comprising a styrene/divinylbenzene copolymer, and 20 ml of n-butyl ether were added. The properties of the porous polymer beads were as follows:

Pore volume (cc/g; hereinafter abbreviated to dVp) at a pore radius in a range of from 200 to 2,000 Å:
dVp=0.72 cc/g.

Pore volume (cc/g; hereinafter abbreviated to Vp) at a pore radius in a range of from 35 to 75,000 Å:
Vp=1.03 cc/g.

Above data were measured by means of a porosimeter.

average particle diameter: 200 μm.

Geometrical standard deviation of particle size distribution (hereinafter abbreviated to $\sigma g$);
$\sigma g = 1.1$.

The polymer beads were insoluble in 100° C. toluene. Thereafter, 14.0 ml of the organo-magnesium compound synthesized in (A) was added dropwise from the dropping funnel over 10 minutes with stirring, during which the contents of the flask were kept at 80° C., and then treatment was continued for 1 hour at the same temperature. The resulting product was separated by filtration and washed twice with each 20-ml of n-butyl ether and then with each 20-ml of n-heptane, and dried under reduced pressure to obtain 5.0 g of a treated organo-magnesium product.

Next, the air in a 100-ml flask equipped with a stirrer and dropping funnel was replaced by argon, and 5.0 g of the treated organo-magnesium product synthesized above, 25 ml of n-heptane, 0.44 g (1.3 mmoles) of tetrabutoxytitanium and 4.5 g (21.6 mmoles) of tetraethoxysilane were added and stirred at 30° C. for 30 minutes.

Next, 4.6 ml of the organo-magnesium compound synthesized in (A) was added dropwise from the dropping funnel over 1 hour, during which the contents of the flask was kept at 5° C. After completion of the addition, stirring was continued at 5° C. for 1 hour and then at room temperature for 1 hour. A solid product formed was separated by filtration and washed thrice with each 25-ml of n-heptane, and dried under reduced pressure to obtain 6.2 g of a brown solid product.

This solid product contained 0.4 wt. % of titanium atoms and 3.9 wt. % of magnesium atoms.

(C) Synthesis of solid catalyst component

The air in a 100-ml flask was replaced by argon, and 6.0 g of the solid product synthesized by reduction in (B), 30.0 ml of monochlorobenzene and 0.41 g (1.5 mmoles) of diisobutyl phthalate were added. Reaction was then carried out at 80° C. for 1 hour.

After completion of the reaction, solid-liquid separation was carried out, followed by washing of solid portion twice with each 30-ml of n-heptane.

After completion of the washing of solid portion, 30.0 ml of monochlorobenzene, 0.53 ml (3.1 mmoles) of n-butyl ether and 9.6 ml (87.3 mmoles) of titanium tetrachloride were added to the flask, and reaction was carried out at 80° C. for 3 hours. After completion of the reaction, solid-liquid separation was carried out at 80° C., and the resulting solid portion was washed twice with each 30-ml of monochlorobenzene at the same temperature. The foregoing treatment with a mixture of n-butyl ether and titanium tetrachloride was once more carried out over 1 hour. The resulting solid portion was washed twice with each 30-ml of n-heptane, and dried under reduced pressure to obtain 5.4 g of a brown solid catalyst component.

This solid catalyst component contained 0.5 wt. % of titanium atoms, 4.3 wt. % of magnesium atoms and 0.7 wt. % of the phthalic acid ester.

Also, the average particle diameter of this solid catalyst component was 200 μm.

(D) Polymerization

Using a 5-liter autoclave equipped with a stirrer, homopolymerization of propylene and random copolymerization of ethylene with propylene were carried out at the first step and second step, respectively.

The autoclave was dried at 80° C. for 1 hour and evacuated by means of a vacuum pump, and 0.5 g of triethylaluminum, 0.13 g of phenyltrimethoxysilane and 564.0 mg of the solid catalyst component prepared in (C) were added, after which hydrogen corresponding to a partial pressure of 0.53 kg/cm² was added.

Thereafter, 1.3 kg of liquid propylene was charged into the autoclave under pressure, and the contents of the autoclave was heated to 75° C. Homopolymerization of propylene was carried out at 75° C. for 15 minutes, and after the unreacted monomer was purged off, a small amount of the polymer was sampled in order to measure [η]p and CXS. Thereafter, hydrogen corresponding to 0.075 kg/cm² was supplied, and the pressure in the autoclave was raised to 8 kg/cm²G with propylene and then to 10 kg/cm²G with ethylene. The temperature was then adjusted to 70° C., and the polymerization of the second step was started.

Thereafter, an ethylene/propylene (50/50 vol %) mixed gas was fed so as to keep the whole pressure at 10 kg/cm²G, and ethylene/propylene copolymerization was carried out for 420 minutes in a gaseous phase.

After completion of the polymerization, the unreacted monomers were purged off to obtain 643 g of a granular thermoplastic elastomer containing no fine powders nor coarse particles and having good powder properties.

The autoclave was opened and inspected to find that no polymers adhered to the inner wall of the autoclave and the stirrer at all.

The amount of the whole polymer produced per 1 g of titanium atoms in the solid catalyst component (g/g; hereinafter abbreviated to PP/Ti) was 228,000. The CXS of the propylene homopolymer produced at the first step (hereinafter abbreviated to P) was 3.8 wt. %.

Also, the whole polymer contained 85 wt. % of the ethylene/propylene copolymer produced at the second step (hereinafter abbreviated to EP). The ethylene content of EP was 48 wt. %. The molecular weights of P portion, EP portion and the whole polymer were $[\eta]p=1.7$, $[\eta]_{EP}=3.8$ and $[\eta]_T=3.5$, respectively.

The adhesive power of the resulting polymer particles was 2.8 g/cm².

COMPARATIVE EXAMPLE 1

(A) Synthesis of solid product

The air in a 200-ml flask equipped with a stirrer and dropping funnel was replaced by argon, and 8.25 g of silica gel (grade, 952 produced by Fuji Davison Chemical Co., Ltd. which was previously calcined at 800° C. for 8 hours in a nitrogen atmosphere; dVp=0.36 cc/g; Vp=1.54 cc/g; average particle diameter=60 μm; σg=1.1; and insoluble in toluene at 100° C.), 41.3 ml of n-heptane, 1.12 g (3.3 mmoles) of tetrabutoxytitanium and 11.8 g (56.7 mmoles) of tetraethoxysilane were charged into the flask. The mixture was then stirred at room temperature for 30 minutes.

Thereafter, 30.0 ml of the organo-magnesium compound synthesized in (A) of Example 1 was added dropwise over 1 hour from the dropping funnel, during which the contents of the flask were kept at 5° C. After completion of the addition, stirring was continued at 5° C. for 30 minutes and then at 30° C. for further 1 hour. A solid product formed was separated by filtration and washed twice with each 40-ml of n-heptane, and dried under reduced pressure to obtain 17.5 g of a brown solid product.

(B) Synthesis of solid catalyst component

The air in a 100-ml flask was replaced by argon, and 4.5 g of the solid product, 15.1 ml of toluene and 1.67 ml (6.2 mmoles) of diisobutyl phthalate were added. Reaction was then carried out at 95° C. for 1 hour.

After completion of the reaction, solid-liquid separation was carried out, followed by washing of solid portion twice with each 15-ml of toluene.

After completion of the washing of solid portion, 15.1 ml of toluene, 1.0 ml (5.7 mmoles) of n-butyl ether and 17.7 ml (161 mmoles) of titanium tetrachloride were added to the flask, and reaction was carried out at 95° C. for 3 hours. After completion of the reaction, solid-liquid separation was carried out at 95° C., and washing of solid portion was repeated twice with each 15-ml of toluene at the same temperature. The foregoing treatment with a mixture of n-butyl ether and titanium tetrachloride was once more carried out over 1 hour. A solid portion was washed twice with each 15-ml of n-heptane, and dried under reduced pressure to obtain 3.6 g of a brown solid catalyst component.

This solid catalyst component contained 1.9 wt. % of titanium atoms, 9.0 wt. % of magnesium atoms and 2.3 wt. % of the phthalic acid ester. The average particle diameter of this solid catalyst component was 60 μm.

(C) Polymerization

P-EP block copolymerization was carried out in the same condition as in (D) of Example 1 using 103.2 mg of the solid catalyst component synthesized in (B) described above. The polymerization conditions and the results of polymerization are shown in Table 1 and Table 2, respectively.

In this case, the pore volume, at a pore radius in a range of from 200 to 2,000 Å, of the porous substance was less than 35% (dVp/Vp×100=23%) of the pore volume at a pore radius in a range of from 35 to 75,000 Å, so that the polymer obtained formed aggregates, its particle properties were very bad and the adhesive power was 8.4 g/cm².

COMPARATIVE EXAMPLE 2

(A) Synthesis of solid product

The air in a 500-ml flask equipped with a stirrer and dropping funnel was replaced by argon, and 150 ml of n-heptane, 7.6 g (22.4 mmoles) of tetrabutoxytitanium and 78 g (378 mmoles) of tetraethoxysilane were added and turned into a uniform solution. Thereafter, 182 ml (400 mmoles) of the organo-magnesium compound synthesized in (A) of Example 1 was gradually added dropwise from the dropping funnel over 3 hours, during which the contents of the flask were kept at 5° C. After completion of the addition, stirring was continued at room temperature for further 1 hour, and solid-liquid separation was carried out at room temperature. The resulting solid portion was then washed thrice with each 300-ml of n-heptane, and dried under reduced pressure to obtain 62.0 g of a brown solid product.

(B) Synthesis of solid catalyst component

The air in a 200-ml flask was replaced by argon, and 15 g of the solid product synthesized in (A), 75 ml of toluene and 8.1 ml of diisobutyl phthalate were added. Reaction was then carried out at 95° C. for 1 hour.

After completion of the reaction, solid-liquid separation was carried out and then the solid portion was washed thrice with each 75-ml of n-heptane.

To the flask were added 38 ml of toluene, 5.0 ml (88.5 mmoles) of n-butyl ether and 88.5 ml (807 mmoles) of titanium tetrachloride, and reaction with the solid portion was carried out at 95° C. for 3 hours.

After completion of the reaction, solid-liquid separation was carried out at 95° C., and then the resulting solid portion was washed twice with each 75-ml of toluene at the same temperature.

The foregoing treatment with a mixture of n-butyl ether and titanium tetrachloride was once more carried out over 1 hour. Washing of the resulting product was then repeated twice with each 75-ml of n-heptane, and the product was dried under reduced pressure to obtain 13 g of a yellow solid catalyst component.

This solid catalyst component contained 1.9 wt. % of titanium atoms, 19.4 wt. % of magnesium atoms and 5.0 wt. % of the phthalic acid ester. The average particle diameter of this solid catalyst component was 35 μm.

(C) Polymerization

P-EP block copolymerization was carried out in the same condition as in (D) of Example 1 using 31.8 mg of the solid catalyst component prepared in (B) described above. The polymerization conditions and the results of polymerization are shown in Table 1 and Table 2, respectively.

In this case, the particle properties of resulting polymer was very bad, because the solid catalyst component was not fixed onto the porous substance. That is, the autoclave was opened and inspected to find that the polymer particles adhered in layers to the inner wall of the autoclave, being in a half solidified state.

COMPARATIVE EXAMPLE 3

(A) Synthesis of solid catalyst component

A solid catalyst component was synthesized as follows by the same method as in Example 5 of JP-A-No. 61-287917.

The air in a 300-ml flask equipped with a stirrer and dropping funnel was replaced by argon, and 57.2 ml of the organomagnesium compound synthesized in (A) of Example 1 was charged. Then, 12.8 ml of silicon tetrachloride was gradually added dropwise over 1 hour during which the contents of the flask was kept at 20° C. After completion of the addition, stirring was continued at 20° C. for further 1 hour. The reaction solution was then filtered through a filter, and the resulting solid portion was washed 4-times with each 100-ml of hexane to synthesize a carrier.

Thereafter, 70 ml of hexane was added to the carrier to form a slurry, and the temperature of the slurry was kept at 60° C.

Thereafter, a solution of 4.2 g of phenol in 100 ml of hexane and 6.4 ml of ethylbenzoate were added, and reaction was carried out at 60° C. for 30 minutes. After filtering the reaction solution, the solid reaction product was washed thrice at 60° C. with each 150-ml of hexane.

Thereafter, 80 ml of monochlorobenzene was added to form a slurry, a solution comprising 122.4 g of

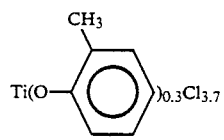

and 48 ml of monochlorobenzene were added, and reaction was carried out at 100° C. for 30 minutes. After completion of the reaction, the reaction solution was filtered at 100° C., and the resulting solid product was washed at 100° C. with 150-ml of toluene and then thrice with each 100-ml of hexane. The product was then dried to obtain 15.1 g of a solid catalyst component.

This solid catalyst component contained 2.5 wt. % of titanium atoms, 20.9 wt. % of magnesium atoms, 1.7 wt. % of phenol and 9.1 wt. % of ethyl benzoate. The average particle diameter of this solid catalyst component was 30 μm.

(B) Polymerization

Using 32.4 mg of the solid catalyst component synthesized in (A) described above, P-EP block copolymerization was carried out in the same manner as in (D) of Example 1 except that 0.2 g of methyl p-toluylate was used as an electron donor in place of phenyltrimethoxysilane.

The polymerization conditions and the results of polymerization are shown in Table 1 and Table 2, respectively. In this case, the change of the catalytic activity with the lapse of time was so large that the catalytic activity was completely lost in the course of the ethylene/propylene random copolymerization in the second step. Consequently, a thermoplastic elastomer was not obtained.

COMPARATIVE EXAMPLE 4

(A) Synthesis of solid product

The air in a 100-ml flask equipped with a stirrer and dropping funnel was replaced by argon, and 6.50 g of a styrene polymer (dvp=0.11 cc/g; Vp=0.59 cc/g; average particle diameter=1,000 μm; σg=2.3; and completely soluble in 100° C.-toluene) previously dried at 80° C. for 1 hour under reduced pressure, 32.5 ml of n-heptane, 0.45 g (1.3 mmoles) of tetrabutoxytitanium and 4.65 g (22.3 mmoles) of tetraethoxysilane were charged into the flask. Stirring was then carried out at room temperature for 45 minutes.

Thereafter, 11.8 ml of the organo-magnesium compound synthesized in (A) of Example 1 was added to the flask dropwise over 45 minutes from the dropping funnel, during which the contents of the flask was kept at 5° C. After completion of the addition, stirring was continued at 5° C. for 45 minutes and then at 30° C. for 45 minutes. The resulting solid portion was washed twice each 33-ml of n-heptane and then dried under reduced pressure to obtain 7.30 g of a brown solid product.

(B) Synthesis of solid catalyst component.

The air in a 100-ml flask was replaced by argon, and 4.41 g of the solid product, 14.7 ml of toluene and 0.34 g (1.3 mmoles) of diisobutyl phthalate were charged to the flask. On keeping the temperature at 95° C., the solid product completely dissolved to fail to recover it. Consequently, synthesis of a solid catalyst component could not be continued.

In this case, the porous substance was soluble in toluene at 100° C. so that a solid catalyst component was not obtained.

COMPARATIVE EXAMPLE 5

(A) Synthesis of solid product

The air in a 200-ml flask equipped with a stirrer and dropping funnel was replaced by argon, and 5.0 g of a styrene/divinylbenzene copolymer (dVp=0.04 cc/g; Vp=0.93 cc/g; average particle diameter=250 μm; σg=1.3; and insoluble in toluene at 100° C.) previously vacuum-dried at 80° C. for 1 hour, 25.0 ml of n-heptane, 0.23 g (0.67 mmoles) of tetrabutoxytitanium and 2.42 g (11.6 mmoles) of tetraethoxysilane were charged to the flask. Stirring was then carried out at 30° C. for 45 minutes.

Thereafter, 6.1 ml of the organo-magnesium compound synthesized in (A) of Example 1 was added to the flask dropwise over 1 hour from the dropping funnel, during which the contents of the flask was kept at 5° C. After completion of the addition, stirring was continued at 5° C. for 45 minutes and then at 30° C. for 45 minutes. The resulting solid portion was then washed thrice with each 30-ml of n-heptane, and dried under reduced pressure to obtain 5.7 g of a brown solid product.

This solid product contained 0.3 wt. % of titanium atoms and 2.5 wt. % of magnesium atoms.

(B) Synthesis of solid catalyst component

The air in a 100-ml flask was replaced by argon, and 5.6 g of the solid product synthesized by reduction in (A), 18.7 ml of toluene and 0.50 ml (1.9 mmoles) of diisobutyl phthalate were charged to the flask. Reaction was then carried out at 95° C. for 1 hour.

After completion of the reaction, solid-liquid separation was carried out and the resulting solid portion was washed twice with each 18.7-ml of toluene.

After completion of the washing, 18.7 ml of toluene, 1.24 ml (7.3 mmoles) of n-butyl ether and 21.9 ml (199 mmoles) of titanium tetrachloride were added to the flask, and reaction was carried out at 95° C. for 3 hours.

After completion of the reaction, solid-liquid separation was carried out at 95° C., and the resulting solid portion was washed twice with each 18.7 ml of toluene at the same temperature. The foregoing treatment with a mixture of n-butyl ether and titanium tetrachloride was once more carried out over 1 hour. The resulting product was then washed twice with each 18.7-ml of n-heptane, and dried under reduced pressure to obtain 4.7 g of a reddish brown solid catalyst component.

On analyzing this solid catalyst component, a trace amount of titanium atoms was detected, but magnesium atoms and the phthalic acid ester could not be detected.

(C) Polymerization

Using the solid catalyst component synthesized in (B) described above, polymerization was carried out in the same condition as in (D) of Example, 1, but a polymer was not obtained.

Even if the porosity of the porous substance is high as compared with that in Example 1, when the pore volume at a pore radius in a range of from 200 to 2,000 Å, i.e. dVp, is small, the catalyst component having a polymerization activity cannot be held in the inner part of the porous substance, so that the solid catalyst component obtained above does not become an effective catalyst for olefin polymerization.

EXAMPLE 2

Using the solid catalyst component synthesized in Example 1, propylene homopolymerization and ethylene/butene-1 random copolymerization were carried out at the first step and second step, respectively.

An autoclave was dried at 80° C. for 1 hour and evacuated by means of a vacuum pump, and 0.5 g of triethylaluminum, 0.13 g of phenyltrimethoxysilane and 372.4 mg of the solid catalyst component prepared in Example 1 were added. Then, hydrogen corresponding to a partial pressure of 0.53 kg/cm$^2$ was charged into the autoclave.

Thereafter, 1.3 kg of liquid propylene was charged into the autoclave under pressure and heated to 75° C. Homopolymerization of propylene was carried out at 75° C. for 10 minutes, and after the unreacted monomer was purged, a small amount of the polymer was sampled in order to measure $[\eta]p$ and CXS. Thereafter, hydrogen corresponding to 0.075 kg/cm$^2$ was supplied, and an ethylene/butene-1 (80/20 vol. %) mixed gas was fed so as to keep the whole pressure at 4 kg/cm$^2$G, and then ethylene/butene-1 copolymerization was carried out at 75° C. for 420 minutes in a gaseous phase. After completion of the copolymerization, the unreacted monomers were purged to obtain 260 g of a thermoplastic elastomer having good particle properties.

The autoclave was opened and inspected to find that no polymers adhered to the inner wall of the autoclave and the stirrer at all.

The amount of the whole polymer produced per 1 g of titanium atoms, i.e. PP/Ti, was 140,000. The whole polymer contained 73 wt. % of the ethylene/butene-1 copolymer (hereinafter abbreviated to EB) produced at the second step. The ethylene content of EB was 77 wt. %.

The molecular weights were as follows: $[\eta]p=2.2$; $[\eta]_{EB}=4.1$; and $[\eta]_T=3.6$. The adhesive power of the polymer particles obtained was 2.4 g/cm$^2$.

EXAMPLE 3

(A) Synthesis of solid product

The air in a 200-ml flask equipped with a stirrer and dropping funnel was replaced by argon, and 7.0 g of a Chromosorb 101 previously vacuum-dried at 80° C. for 1 hour and 28 ml of n-butyl ether were charged into the flask. Thereafter, 20.0 ml of the organo-magnesium compound synthesized in (A) of Example 1 was added dropwise from the dropping funnel over 30 minutes with stirring, during which the contents of the flask were kept at 80° C., and treatment was continued at the same temperature for further 1 hour. The resulting product was washed twice with each 20-ml of n-butyl ether and then twice with each 20-ml of n-heptane, and dried under reduced pressure to obtain 7.0 g of a treated organo-magnesium product. Next, the air in a 100-ml flask equipped with a stirrer and dropping funnel was replaced by argon, and 7.0 g of the treated organo-magnesium product synthesized above, 35 ml of n-heptane, 0.62 g (1.8 mmoles) of tetrabutoxytitanium and 6.31 g (30.2 mmoles) of tetraethoxysilane were charged to the flask. Stirring was then continued at 30° C. for 30 minutes.

Thereafter, 16.0 ml of the organo-magnesium compound synthesized in (A) of Example 1 was added to the flask dropwise from the dropping funnel over 1 hour, during which the contents of the flask were kept at 5° C. After completion of the addition, stirring was continued at 5° C. for 1 hour and then at room temperature for further 1 hour, the resulting product was washed thrice with each 30-ml of n-heptane, and then dried under reduced pressure to obtain 11.6 g of a brown solid product.

(B) Synthesis of solid catalyst component

The air in a 100-ml flask was replaced by argon, and 4.14 g of the solid product, 13.8 ml of toluene, 0.91 ml (5.4 mmoles) of n-butyl ether and 16.1 ml (146 mmoles) of titanium tetrachloride were charged to the flask. Reaction was then carried out at 95° C. for 3 hours. After completion of the reaction, solid-liquid separation was carried out at 95° C., and the resulting solid portion was washed twice with each 20.0-ml of toluene at the same temperature. The foregoing treatment with a mixture of n-butyl ether and titanium tetrachloride was once more carried out over 1 hour. The resulting product was then washed twice with each 20.0-ml of n-heptane, and dried under reduced pressure to obtain 3.53 g of a brown solid catalyst component.

This solid catalyst component contained 1.6 wt. % of titanium atoms and 6.8 wt. % of magnesium atoms. The average particle diameter of this solid catalyst component was 200 μm.

(C) Polymerization

Using a 5-liter autoclave equipped with a stirrer, ethylene homopolymerization and ethylene/propylene random copolymerization were carried out at the first step and second step, respectively.

The autoclave was dried at 80° C. for 1 hour, 800 g of butane was supplied, and the contents of the autoclave was heated to 60° C. Hydrogen corresponding to a partial pressure of 3 kg/cm$^2$G was added, and the pressure in the autoclave was raised to 20 kg/cm$^2$G with ethylene. Thereafter, 0.5 g of triethylaluminum, 0.13 g of phenyltrimethoxysilane and 313.2 mg of the solid catalyst component prepared in (B) described above were charged, together with a small amount of n-heptane, into the autoclave by means of argon pressure. Homopolymerization of ethylene was carried out for 35 minutes, during which the whole pressure was kept at 20 kg/cm$^2$G and the temperature was kept at 60° C. The unreacted monomer and butane were purged, and a small amount of the polymer was sampled in order to measure $[\eta]_E$. Thereafter, hydrogen corresponding to 0.075 kg/cm²G was supplied, and the pressure in the autoclave was raised to 8 kg/cm²G with propylene and then to 10 kg/cm²G with ethylene. The temperature was then adjusted to 70° C., and the polymerization of the second step was started.

Thereafter, an ethylene/propylene (50/50 vol. %) mixed gas was fed so as to keep the whole pressure at 10 kg/cm²G, and ethylene/propylene copolymerization was carried out for 90 minutes in a gaseous phase.

After completion of the copolymerization, the unreacted monomers were purged to obtain 338 g of a granular thermoplastic elastomer containing no fine powders nor coarse particles and having good powder properties. The autoclave was opened and inspected to find that no polymers adhered to the inner wall of the autoclave and the stirrer at all.

The amount of the whole polymer produced per 1 g of the solid catalyst, i.e. P/cat, was 1,080.

The intrinsic viscosity, $[\eta]_E$, of the ethylene homopolymer (hereinafter abbreviated to E) produced at the first step was 1.7. The whole polymer contained 85 wt. % of the ethylene/propylene copolymer produced at the second step. The ethylene content of EP was 48 wt. %, and the intrinsic viscosity of the whole polymer and EP portion were $[\eta]_T = 2.9$ and $[\eta]_{EP} = 3.1$, respectively. The adhesive power of the polymer particles obtained was 4.2 g/cm².

EXAMPLE 4

(A) Synthesis of solid product

The air in a 200-ml flask equipped with a stirrer and dropping funnel was replaced by argon, and 13.2 g of an acrylonitrile/divinylbenzene copolymer (dVp=0.47 cc/g; Vp=0.90 cc/g; average particle diameter=80 μm; σg=1.6; and insoluble in toluene at 100° C.) previously dried at 80° C. for 60 minutes under reduced pressure, 65.5 ml of n-heptane, 0.60 g (1.8 mmoles) of tetrabutoxytitanium and 6.23 g (29.9 mmoles) of tetraethoxysilane were charged to the flask. Stirring was then continued at 30° C. for 45 minutes.

Thereafter, 16.0 ml of the organo-magnesium compound synthesized in (A) of Example 1 was added to the flask dropwise from the dropping funnel over 45 minutes, during which the contents of the flask were kept at 5° C. After completion of the addition, stirring was continued at 5° C. for 45 minutes and then at 30° C. for 45 minutes, the resulting product was washed twice with each 65.5-ml of n-heptane, and dried under reduced pressure to obtain 16.7 g of a brown solid product.

(B) Synthesis of solid catalyst component

The air in a 100-ml flask was replaced by argon, and 5.38 g of the solid product synthesized by reduction in (A) described above, 18.0 ml of toluene and 0.82 ml (3.1 mmoles) of diisobutyl phthalate were charged to the flask. Reaction was then carried out at 95° C. for 1 hour.

After completion of the reaction, solid-liquid separation was carried out, and the resulting solid portion was washed twice with each 18.0-ml of toluene.

After completion of the washing, 18.0 ml of toluene, 1.2 ml (7.1 mmoles) of n-butyl ether and 21.0 ml (191 mmoles) of titanium tetrachloride were added to the flask, and reaction was carried out at 95° C. for 3 hours. After completion of the reaction solid-liquid separation was carried out at 95° C., and the resulting product was washed twice with each 18.0-ml of toluene at the same temperature. The foregoing treatment with a mixture of n-butyl ether and titanium tetrachloride was once more carried out over 1 hour. The resulting product was then washed twice with each 18.0-ml of n-heptane, and dried under reduced pressure to obtain 7.61 g of a brown solid catalyst component.

This solid catalyst component contained 6.2 wt. % of titanium atoms, 4.0 wt. % of magnesium atoms and 1.4 wt. % of the phthalic acid ester.

The average particle diameter of this solid catalyst component was 80 μm.

(C) Polymerization

Using 513.4 mg of the solid catalyst component prepared in (B) described above, E-EP block copolymerization was carried out in the same condition as in (C) of Example 3. The polymerization conditions and the results of polymerization are shown in Table 3 and Table 4, respectively.

EXAMPLE 5

(A) Synthesis of solid product

The air in a 1,000-ml flask equipped with a stirrer and dropping funnel was replaced by argon, and 74.0 g of a styrene/divinylbenzene copolymer (dVp=0.63 cc/g; Vp=1.30 cc/g; average particle diameter=50 μm; σg=1.3; and insoluble in toluene at 100° C.) previously dried at 80° C. for 30 minutes under reduced pressure, 370 ml of n-heptane, 6.69 g (19.7 mmoles) of tetrabutoxytitanium and 70.9 g (340 mmoles) of tetraethoxysilane were charged to the autoclave. Stirring was then continued at 30° C. for 45 minutes.

Thereafter, 180 ml of the organo-magnesium compound synthesized in (A) of Example 1 was added to the autoclave dropwise from the dropping funnel over 45 minutes, during which the contents of the flask was kept at 5° C. After completion of the addition, stirring was continued at 5° C. for 45 minutes and then at 30° C. for 45 minutes. The resulting product was then washed twice with each 300-ml of n-hexane, and dried under reduced pressure to obtain 126.3 g of a brown solid product.

(B) Synthesis of solid catalyst component

The air in a 1,000-ml flask was replaced by argon, and 114.6 g of the solid product synthesized by reduction in (A) described above, 382 ml of toluene and 32.1 ml (120 mmoles) of diisobutyl phthalate were charged to the flask. Reaction was then carried out at 95° C. for 1 hour.

After completion of the reaction, solid-liquid separation was carried out and the resulting product was washed twice with each 300-ml of toluene.

After completion of the washing, 382 ml of toluene, 25.3 ml (149 mmoles) of n-butyl ether and 447 ml (4,070 mmoles) of titanium tetrachloride were added to the flask, and reaction was carried out at 95° C. for 3 hours. After completion of the reaction, solid-liquid separation was carried out at 95° C., and the resulting solid portion was washed twice with each 300-ml of toluene at the same temperature. The foregoing treatment with a mixture of n-butyl ether and titanium tetrachloride was once more carried out over 1 hour. The resulting product was then washed twice with each 300-ml of n-hexane, and dried under reduced pressure to obtain 93.9 g of a brown solid catalyst component.

This solid catalyst component contained 0.51 wt. % of titanium atoms, 7.2 wt. % of magnesium atoms and 2.5 wt. % of the phthalic acid ester.

The average particle diameter of this solid catalyst component was 50 μm.

(C) Polymerization

Using a 5-liter autoclave equipped with a stirrer, ethylene/propylene random copolymerization was carried out.

50 Grams of polypropylene powders was added as a dispersing agent to the autoclave which was then evacuated, and the contents of the autoclave was heated to 60° C. Thereafter, hydrogen corresponding to 0.61 kg/cm$^2$G was supplied, and the pressure in the autoclave was raised to 10 kg/cm$^2$G with an ethylene/propylene (50/50 vol. %) mixed gas. Further, 0.5 g of triethylaluminum, 0.13 g of phenyltrimethoxysilane and 418.2 mg of the solid catalyst component prepared in (B) described above were charged, together with a small amount of n-heptane, into the autoclave by means of argon pressure. The ethylene/propylene mixed gas was fed so as to keep the whole pressure at 10 kg/cm$^2$G, and ethylene/propylene copolymerization was carried out for 50 minutes in a gaseous phase.

After completion of the polymerization, the unreacted monomers were purged to obtain 151 g of a granular elastomer containing no fine powders nor coarse particles and having good powder properties. Also, no polymer adhered to the inner wall of the autoclave and the stirrer at all.

The amount of the whole polymer produced per 1 g of the solid catalyst, i.e. P/cat, was 360. The polymerization conditions and the results of polymerization are shown in Table 5 and Table 6, respectively.

EXAMPLE 6

(A) Synthesis of solid catalyst component

The air in a 100-ml flask was replaced by argon, and 2.74 g of the solid product synthesized by reduction in (A) of Example 5, 9.1 ml of toluene, 0.60 ml (3.5 mmoles) of n-butyl ether and 10.6 ml (96.4 mmoles) of titanium tetrachloride were charged to the flask. Reaction was then carried out at 95° C. for 3 hours. After completion of the reaction, solid-liquid separation was carried out at 95° C., and the resulting product was washed twice with each 10-ml of toluene at the same temperature. The foregoing treatment with a mixture of n-butyl ether and titanium tetrachloride was once more carried out. The resulting product was then washed twice with each 10-ml of n-heptane, and dried under reduced pressure to obtain 2.47 g of a brown solid catalyst component. This solid catalyst component contained 2.0 wt. % of titanium atoms and 6.9 wt. % of magnesium atoms, and its average particle diameter was 50 μm.

(B) Polymerization

Using the solid catalyst component prepared in (A) described above, ethylene/propylene random copolymerization was carried out in the same manner as in (C) of Example 5 except that the amount of the solid catalyst component, hydrogen partial pressure and polymerization time were changed as shown in Table 1, and that the electron donor was not made to coexist. The polymerization conditions and the results of polymerization are shown in Table 5 and Table 6, respectively.

EXAMPLE 7

Using the solid catalyst component prepared in (B) of Example 5 and a 5-liter autoclave equipped with a stirrer, ethylene/propylene/1,9-decadiene random copolymerization was carried out.

50 Grams of polypropylene powders was added as a dispersing agent to the autoclave which was then evacuated, and the contents of the autoclave was heated to 60° C. Thereafter, hydrogen corresponding to 0.41 kg/cm$^2$G was supplied, and the pressure in the autoclave was raised to 10 kg/cm$^2$G with an ethylene/propylene (50/50 vol. %) mixed gas. Further, 0.5 g of triethylaluminum and 0.13 g of phenyltrimethoxysilane were charged, together with a small amount of n-heptane, into the autoclave by means of argon pressure. Thereafter, 15 ml of 1,9-decadiene was charged into the autoclave by means of argon pressure, and then 331.0 mg of the solid catalyst component prepared in (B) of Example 5 was charged, together with a small amount of n-heptane, into the autoclave by means of argon pressure. The ethylene/propylene mixed gas was fed so as to keep the whole pressure at 10 kg/cm$^2$G, and ethylene/propylene/1,9-decadiene random copolymerization was carried out for 60 minutes.

After completion of the polymerization, the unreacted monomers were purged to obtain 140 g of a granular elastomer containing no fine powders nor coarse particles and having good powder properties. Also, no polymer adhered to the inner wall of the autoclave and the stirrer at all.

The polymerization conditions and the results of polymerization are shown in Table 5 and Table 6, respectively.

EXAMPLE 8

Using the solid catalyst component prepared in (B) of Example 5 and a 26-liter fluidized bed gas-phase polymerization apparatus, ethylene/butene random copolymerization was carried out.

The polymerization reactor of the apparatus was heated to 70° C., and 300 g of polypropylene powders, previously dried under reduced pressure, was charged as a dispersing agent. Thereafter, 4.26 g of triethylaluminum, 1.11 g of phenyltrimethoxysilane and 1.20 g of the solid catalyst component prepared in (B) of Example 5 were charged into the reactor with a small amount of n-hexane by means of the pressure of argon. A mixed gas of ethylene, butene-1 and hydrogen, previously regulated so that the ethylene/butene-1/hydrogen molar ratio was 3/26.5/20.5, was circulated through the polymerization reactor at a flow rate of 0.3 m/sec under a pressure of from 7 to 7.5 kg/cm$^2$G. The fluidized bed gas-phase copolymerization of ethylene with butene-1 was carried out for 7 hours, during which when the above molar ratio deviated from the determined value, it was returned to that value by additionally adding the required gas, and also the ratio of the height of polymer in the reactor to the diameter of the reaction (l/d) was kept at from 2 to 4. After completion of the copolymerization, the resulting polymer was discharged, by an amount corresponding to that to be produced, from the polymerization reactor. The copolymerization was repeated six times in the same procedure as above using the remaining polymer in the apparatus as a dispersing agent for the next polymerization. By these operations, the amount of the polypropylene powders used at first and contained in the resulting polymer decreased to a negligible degree.

The resulting polymer contained no fine powders nor coarse particles, having good powder properties. It [η]=1.4 and adhesive power=4.6 g/cm². Also, the amount of the whole polymer produced per 1 g of the solid catalyst, i.e. P/cat, was 540 in any of six these polymerizations.

TABLE 1

| | Polymerization conditions | | | | | | | | |
|---|---|---|---|---|---|---|---|---|---|
| | First step | | | | | Second step | | | |
| | Solid catalyst component (mg) | Triethyl-aluminum (g) | Electron donor (g) | Temperature (°C.) | Time (min) | $C_2'/\alpha$-olefin composition (vol. %) | Temperature (°C.) | Pressure (kg/cm²G) | Time (min) |
| Example 1 | 564.0 | 0.5 | Phenyltrimethoxy-silane 0.13 | 75 | 15 | $C_2'/C_3' = 50/50$ | 70 | 10 | 420 |
| Comparative example 1 | 103.2 | " | Phenyltrimethoxy-silane 0.13 | " | 10 | " | " | " | 390 |
| Comparative example 2 | 31.8 | " | Phenyltrimethoxy-silane 0.13 | " | " | " | " | " | 400 |
| Comparative example 3* | 32.4 | " | Methyl p-toluylate 0.2 | " | " | " | " | " | 240 |
| Example 2 | 372.4 | " | Phenyltrimethoxy-silane 0.13 | " | " | $C_2'/C_4' = 80/20$ | 75 | 4 | 420 |

*Polymerization activity was completely lost in the course of the second step.
Note:
First step (amount added) $C_3'$ 1.3 kg $H_2$ 0.53 kg/cm²
Second step (amount added) $H^2$ 0.075 kg/cm²

TABLE 2

| | Results of polymerization | | | | | | | | | |
|---|---|---|---|---|---|---|---|---|---|---|
| | Polymerization amount (g) | PP/Ti (g/g) | Ratio of amounts Produced in 1st step/2nd step (wt. ratio) | First step CXS (wt. %) | $[\eta]_P$ | $[\eta]_{EP}$ | $[\eta]_T$ | Second step $C_2$ content (wt. %) | Adhesive power of polymer Particles (g/cm²) | Condition of autoclave |
| Example 1 | 643 | 228,000 | 15/85 | 3.8 | 1.7 | 3.8 | 3.5 | 48 | 2.8 | No polymer adhered. |
| Comparative example 1 | 435 | 220,000 | 18/82 | 1.8 | 2.2 | 3.7 | 3.5 | 47 | 8.4 | No polymer adhered. |
| Comparative example 2 | 328 | 547,000 | 32/68 | 2.3 | 2.3 | 3.0 | 2.8 | 47 | Immeasurable | Polymer particles adhered. |
| Comparative example 3 | 208 | 257,000 | 54/46 | 4.4 | 2.4 | 3.9 $[\eta]_{EB}$ | 3.1 | 48 | " | Polymer particles adhered. |
| Example 2 | 260 | 140,000 | 27/73 | 4.0 | 2.2 | 4.1 | 3.6 | 77 | 2.4 | No polymer adhered. |

TABLE 3

| | Polymerization conditions | | | | | | | | |
|---|---|---|---|---|---|---|---|---|---|
| | First step | | | | | Second step | | | |
| | Solid catalyst component (mg) | Organo-aluminum (g) | Phenyltri-methoxysilane (g) | Temperature (°C.) | Time (min) | $C_2'/C_3'$ composition (vol %) | Temperature (°C.) | Hydrogen partial Pressure (kg/cm²G) | Whole Pressure (kg/cm²G) | Time (min) |
| Example 3 | 313.2 | Triethyl-aluminum 0.5 | 0.13 | 60 | 50 | 50/50 | 70 | 0.075 | 10 | 90 |
| Example 4 | 513.4 | Triethyl-aluminum 0.5 | " | " | 40 | " | " | " | " | " |

Note:
First step Hydrogen partial pressure 3.0 kg/cm²G Whole pressure 20 kg/cm²G contained 82.8 wt. % of ethylene and had properties:

TABLE 4

| | Results of polymerization | | | | | | | | |
|---|---|---|---|---|---|---|---|---|---|
| | Polymerization amount (g) | P/Cat (g/g) | Ratio of amounts produced in 1st step/ 2nd step (wt. ratio) | $[\eta]_E$ | $[\eta]_{EP}$ | $[\eta]_T$ | Second step $C_2$ content (wt. %) | Adhesive power of polymer particles (g/cm²) | Condition of autoclave |
| Example 3 | 338 | 1,080 | 15/85 | 1.6 | 3.1 | 2.9 | 48 | 4.2 | No polymer adhered. |
| Example 4 | 469 | 910 | 13/87 | 2.5 | 2.9 | 2.8 | 47 | 5.0 | No polymer adhered. |

TABLE 5

| | Solid catalyst component (mg) | Triethyl-aluminum (g) | Phenyltri-methoxy silane (g) | Polymerization conditions | | | | |
|---|---|---|---|---|---|---|---|---|
| | | | | $C_2'/\alpha$-olefin composition (vol. %) | Temperature (°C.) | Hydrogen partial pressure (kg/cm$^2$G) | Whole pressure (kg/cm$^2$G) | Time (min) |
| Example 5 | 418.2 | 0.5 | 0.13 | $C_2'/C_3' = 50/50$ | 60 | 0.61 | 10 | 50 |
| Example 6 | 315.0 | " | None | " | " | 0.10 | " | 60 |
| Example 7 | 331.0 | " | 0.13 | $C_2'/C_3' = 50/50$* | " | 0.41 | " | " |

*Coexistence of 1,9-decadiene

TABLE 6

| | Results of polymerization | | | | | |
|---|---|---|---|---|---|---|
| | Polymerization amount (g) | P/cat (g/g) | [η] | $C_2'$ content (wt. %) | 1,9-Decadiene content (wt. %) | Adhesive power of polymer particles (g/cm$^2$) | Condition of autoclave |
| Example 5 | 151 | 360 | 2.6 | 77 | — | 2.1 | No polymer adhered. |
| Example 6 | 175 | 560 | 2.1 | 34 | — | 4.0 | No polymer adhered. |
| Example 7 | 140 | 420 | 2.5 | 62 | 9.7 | 5.7 | No polymer adhered. |

As described above, the following effects can be obtained by using the solid catalyst component for olefin polymerization of the present invention.

(1) Granular olefinic thermoplastic elastomers and olefinic elastomers can be produced economically and stably, it becoming possible to largely decrease the manufacturing cost as compared with the conventional methods.

(2) The catalytic activity per titanium atom is so high that, even if any particular operation for removing catalyst residues is not applied, the contents of a halogen atom and titanium atom closely related to the coloration, stability and ease of corrosion of polymers are very little. That is, equipments for removing catalyst residues become unnecessary, it becoming possible to decrease the manufacturing cost.

(3) The thermoplastic elastomers and olefinic elastomers are obtained in a granular form, so that handling, molding, etc. are easy.

What is claimed is:

1. A solid catalyst component for olefin polymerization which comprises a catalyst component comprising a titanium trichloride catalyst or a titanium/magnesium composite catalyst containing chlorine fixed onto a porous substance of which the pore volume, at a pore radius in a range of from 200 to 2,000 Å is 0.3 cc/g or more, said pore volume is 35% or more of the pore volume at a pore radius in a range of from 35 to 75,000 Å, the average particle diameter is from 5 to 300 μm, the geometrical standard deviation of the particle size distribution is 2 or less and the solubility in toluene at 100° C. is 30 wt. % or less, the amount of the catalyst component to be fixed being from 1 to 70 wt. % as a content in the solid catalyst component.

2. A solid catalyst component for olefin polymerization according to claim 1, wherein the porous substance is porous inorganic oxides or porous organic polymers.

3. A solid catalyst component for olefin polymerization according to claim 1, wherein the porous substance is porous organic polymers.

4. A solid catalyst component for olefin polymerization according to claim 2, wherein the porous inorganic oxide is $SiO_2$, $Al_2O_3$, MgO, $TiO_2$, $ZrO_2$, $SiO_2.Al_2O_3$, $MgO.Al_2O_3$, or $MgO.SiO_2.Al_2O_3$.

5. A solid catalyst component for olefin polymerization according to claim 2, wherein the porous organic polymer is polystyrene-series, polyvinylchloride-series, polyolefin-series or polyacrylonitrile-series polymers.

6. A solid catalyst component for olefin polymerization according to claim 4, wherein the porous organic polymer is styrene-divinylbenzene copolymer or acrylonitrile-divinylbenzene copolymer.

7. A solid catalyst component according to claim 1, wherein the catalyst component is fixed onto the porous substance by a method comprising reducing an alkoxytitanium compound with an organo-magnesium compound in the coexistence of the porous substance, and then treating the resulting solid product with a mixture of an ether compound and titanium tetrachloride.

8. A solid catalyst component for olefin polymerization according to claim 1, wherein the catalyst component is fixed onto the porous substance by a method comprising reducing an alkoxytitanium compound with an organomagnesium compound in the coexistence of an organosilicone compound having an Si—O bond and an organic porous polymer.

9. A solid catalyst component according to claim 1, wherein a titanium compound for producing the titanium trichloride catalyst or the titanium/magnesium composite catalyst is one represented by the general formula $Ti(OR^1)_a X_b$ (wherein $R^1$ is $C_1$-$C_{20}$ hydrocarbon residue, X is halogen atom, a is $0 \leq a \leq 4$, b is $0 \leq b \leq 4$, and $a+b=3$ or 4).

10. A solid catalyst component for olefin polymerization according to claim 1, wherein the titanium/magnesium composite catalyst is produced from a magnesium compound containing a magnesium-carbon bond or magnesium-hydrogen bond having a reducing power.

11. A solid catalyst component for olefin polymerization according to claim 1, wherein the titanium/magnesium composite catalyst is produced from a magnesium compound having no reducing power.

12. A solid catalyst component for olefin polymerization according to claim 10, wherein the magnesium compound having a reducing power is selected from the group consisting of diethylmagnesium, dibutylmagnesium, dihexylmagnesium, ethylmagnesium chloride, butylmagnesium chloride, hexylmagnesium chloride, butylethoxymagnesium and butylmagnesium hydride.

13. A solid catalyst component for olefin polymerization according to claim 11, wherein the magnesium compound having no reducing power selected from the group consisting of magnesium dihalide, alkoxymagnesium compound, and carboxylate of magnesium.

* * * * *